United States Patent Office 3,341,392
Patented Sept. 12, 1967

3,341,392
LAMINATING METHOD AND ARTICLE USING CARBOXYLATED LATEX ADHESIVE
John Hubert Potter, Worcester, Worcestershire, England, assignor to Sto-Chem, Bromsgrove, England, a British limited-liability company
No Drawing. Filed Mar. 18, 1964, Ser. No. 352,959
Claims priority, application Great Britain, Mar. 20, 1963, 11,032/63
15 Claims. (Cl. 161—137)

This invention relates to laminates of sheets of fibrous material, to methods of making such laminates, and to compositions of matter useful in the manufacture of such laminates. More particularly, but not exclusively, this invention relates to the manufacture of corrugated paper.

The term "papers and boards" when used in this specification, designates paper-like materials of a wide range of thickness, it being usual in the paper trade to refer to the thinner materials as "papers" and the thicker materials as "paper boards."

Corrugated paper is frequently made by the Stein-Hall process which is described in United Kingdom Patent No. 466,062. The adhesive used in the Stein-Hall process is an aqueous starch solution, which is water soluble after drying. It is thus proved impossible to make weather proof corrugated paper by the Stein-Hall process, since, even when weather proof paper is used, the bonds between the component layers of paper fail when the corrugated paper becomes damp.

It is an object of the present invention to provide a laminate of at least two sheets of a cellulosic fibrous material, in which the bonding between the sheets is water or shower-proof.

It is another object of this invention to provide a method of making such a laminate.

A further object of this invention is to provide a composition of matter useful in the manufacture of such laminates.

I have, surprisingly discovered that sheets of paper or paper board may be firmly bonded together to give a water or shower-proof bond by a conventional carbohydrate or proteinaceous paper adhesive in combination with an aqueous dispersion of a rubbery styrene-butadiene copolymer (sometimes referred to therein as an S.B.R. latex) having polar groups in the copolymer chain, together with a cross-linking agent.

Accordingly, this invention consists in a composition of matter comprising an aqueous solution of an adhesive selected from the group consisting of carbohydrates and proteinaceous substances, a latex dispersion, compatible with the adhesive, of a rubbery copolymer of styrene and butadiene having active polar groups, and a cross-linking agent operative to chemically link the adhesive to the copolymer.

Further, in a method comprising the steps of providing at least first and second sheets of fibrous material, which fibrous material comprises cellulose fibers, coating at least part of a surface of at least the first sheet with an aqueous solution of an adhesive selected from the group consisting of carbohydrates and proteinaceous substances, and applying a surface of the second sheet to the coated surface of the first sheet so as to bond the two sheets together, this invention consists in adding to the adhesive, before coating the surface of the first sheet, a latex dispersion, compatible with the adhesive, of a rubbery copolymer of styrene and butadiene having active polar groups and a cross-linking agent operative to link the adhesive to the copolymer under the conditions of bonding.

This invention further consists in a laminate comprising at least first and second sheets of a fibrous material, the first sheet being bonded to the second sheet by an adhesive composition, the composition comprising an adhesive selected from the group consisting of carbohydrates and proteinaceous substances, a latex, compatible with the adhesive when dispersed in water, of a rubbery copolymer of styrene and butadiene having active polar groups, and a cross-linking agent chemically bound to the adhesive and the latex.

When the method of this invention is used, the cross-linking agent, during the setting of the adhesive (which may be effected in a conventional manner), reacts with the adhesive and with polar groups of the rubbery copolymer so as to link the adhesive chemically to the rubber, thereby forming a water or shower-proof bond.

The rubbery styrene-butadiene copolymer latex must contain polar groups in the copolymer chain and must be compatible with the adhesive, that is to say: when mixed with the adhesive it must not flocculate, but must give a stable mixture. The selection of the latex is largely a matter of trial and error, its compatibility depending on the nature of the polar group, the adhesive, and the soap system of the latex dispersion. While several latices are compatible with simple starch adhesives it is found that fewer are compatible with the Stein-Hall adhesives of British Patent No. 466,062.

The preferred latices of this invention are S.B.R. latices which have carboxyl groups on the copolymer chains. Examples of such carboxylated S.B.R. latices are those sold by Messrs. Sto-Chem Limited under the designations 2752 and 6205, Dow 630 sold by Dow Chemical Company, Revenex 3500 sold by Revertex Limited, and the latex sold by Imperial Chemical Industries Limited under the designation S.L. 103.

The adhesive is preferably a carbohydrate adhesive, and may comprise an aqueous solution or dispersion of starch, dextrine, gums or a mono or di-saccharide. The most preferred carbohydrate adhesives for the manufacture of corrugated board are suspensions of ungelatinized starch in alkaline solutions of gelatinized starch, which are disclosed in the Stein-Hall British Patent No. 466,062.

When the present invention is applied to the manufacture of solid board, it is preferred to employ a modified or converted starch and/or dextrine based adhesive, such modified adhesives being less viscous than the Stein-Hall adhesives.

Suitable cross-linking agents for the use in conjunction with carboxylated S.B.R. latices and carbohydrate adhesives are the A-stage urea-formaldehyde or melamine-formaldehyde resins which have a low degree of polymerisation. Most preferred is substantially unconverted dimethylol urea $O=C-(NHCH_2OH)_2$, such as that sold by B.I.P. Chemicals Limited under the designations B.C. 5 and B.C. 6. Trimethylol melamine may be used, but is economically undesirable: Phenol-formaldehyde resole is inoperative.

The quantity of carboxylated rubber and dimethylol urea employed may be varied from about 140 parts by weight of dry rubber and 35 parts by weight of dry dimethylol urea to about 600 parts by weight of dry rubber and 150 parts by weight of dry dimethylol urea per 1,000 parts by weight of dry starch; in general the higher the degree of required water resistance and the higher the degree of modification of the starch, the higher should be the quantities of rubber and dimethylol urea employed.

The adhesive may be an aqueous solution or suspension of a proteinaceous substance, for instance casein, soya-bean protein or bone or hide glue. When such proteinaceous adhesives are used in conjunction with a carboxylated S.B.R. latex, the cross-linking agent may be a water soluble complex of di- or tri-valent metal.

An understanding of the theory of the present invention is not essential to its operation, and the scope of the present invention is in no way limited by theoretical principles. However, it is believed that the complex must be such that it will decompose under the conditions of bonding of the adhesive, so as to form the uncomplexed cation of the metal, generally by decomposition to the hydroxide or hydrated oxide of the metal. The metal cation is then believed to react with the protein and with carboxyl groups on the rubber copolymer molecules to bind the protein to the rubber.

The selection of a suitable complex compound may be accomplished by simple testing and is within the capability of a worker skilled in the art. Clearly the complex must decompose at a temperature which does not exceed that at which the adhesive is dried; for instance where the adhesive comprises casein and is employed at room temperature, the complex should decompose at room temperature on drying. However, when the adhesive is dried at elevated temperatures, and it is desired to store the mixture of adhesive, S.B.R. latex and complex for some time, the complex should be stable in aqueous solution at room temperature.

The metal of the complex should not be detrimental to the latex. For instance, cuprammonium salts should not be used.

Metal complexes which may be used to cross-link proteinaceous adhesives to carboxylated S.B.R. latices include magnesium ethoxide, basic magnesium acetate, amine salts of magnesium, sodium aluminate, ammonium zincate, basic magnesium carbonate, and complex carbonates of zirconium, vanadium, molybdenum and tungsten. Sodium aluminate decomposes slowly in water to give aluminium hydroxide and should therefore be incorporated into the adhesive immediately prior to use. The preferred metal complex is ammonium zincate.

The present invention was made during research into modifying the Stein-Hall process so as to produce water or shower-proof corrugated paper, and is particularly suited for application to the manufacture of corrugated paper. However, it may also be applied to the formation of laminates of any other fibrous material which comprises cellulose fibers, for instance in the production of solid board, viz: board made by combining flat paper boards together with or without papers. The process is also applicable to the manufacture of compounded papers and/or paper boards which are water-resistant, that is: which comprise papers and/or paper boards which may or may not themselves be water or shower-proof but are bonded together with an adhesive which is sufficiently water-resistant to prevent the assembly from falling apart when subjected to air of high relative humidity.

The bond produced by the present method is water or shower-proof, depending on the composition used, and is normally stronger than the bond produced by the corresponding adhesive in the absence of the latex and cross-linking agent.

I have found that the above described combination of the Stein-Hall starch adhesive, a carboxylated S.B.R. latex and dimethylol urea cross-links rapidly in the presence of aluminium ions. It is known to render papers or paper boards water-proof by treating them with aluminum triformate, and papers and paper boards treated with this material are particularly suitable for bonding by my process, owing to the presence of aluminium ions in the paper. Best results are obtained when the papers or paper boards have been treated with aluminium triformate at both the beater and size press stages. Particularly suitable are those papers and paper boards manufactured by the methods advocated by Messrs. Catomance Ltd. and incorporating the compounded aluminium triformate which they market under the trade name "Mystolene."

The following examples illustrate the invention.

*Example 1*

The following composition was found to be useful in the manufacture of corrugated paper using the Stein-Hall process.

550 gallons of Stein-Hall adhesive containing:
   1170 pounds of maize starch (equivalent to 995 pounds of dry maize starch).
   30 gallons of Sto-Chem 2752 carboxylated S.B.R. (48% solids).
   50 pounds of B.I.P. B.C. 5 dimethylol urea (6% solids).

The curing agent was added after mixing the latex and adhesive.

The starch solution contained 16% of ungelatinised starch, 3% carrier starch, 1% each of caustic soda and borax and formalin, the remainder being water.

Sto-Chem 2752 is a carboxylated S.B.R. prepared from butadiene, styrene and itaconic acid in weight ratio of 44%:51%:5%. The polymer was prepared by emulsion polymerisation using the sodium alkyl benzene sulphanate sold by Allied Chemical as Nacconal NRSF.

B.I.P. B.C. 5 dimethylol urea contains substantially unpolymerised dimethylol urea and is sold by British Industrial Plastics Limited.

If desired, further water may be added to adjust the viscosity of the composition.

*Example 2*

The following compositions were also found to be suitable for use as water-proof adhesives, each one containing an alkaline starch adhesive.

| Composition | Adhesive | Rubber Latex | Cross-Linking Agent | Dry weight ratios | Overall Concentration |
|---|---|---|---|---|---|
| A | Starch Products Limited Dry Gum 33 | Sto-Chem 2752 | B.C. 5 | 100 20 5 | 28% |
| B | Starch Products Limited Dry Gum 29 | Sto-Chem 2752 | B.C. 5 | 100 26 6.5 | 33% |
| C | Corn Products (Sales) Ltd. Lamodex D1132 | Sto-Chem 2752 | B.C. 5 | 100 16 4 | 20% |
| D | Corn Products (Sales) Ltd. Lamodex D1145 | Sto-Chem 2752 | B.C. 5 | 100 24 6 | 40% |

The compositions were prepared by the method of Example 1.

Example 3

The following compositions containing neutral carbohydrate adhesives were found to be water-proof, on drying.

| Composition | Adhesive | Rubber Latex | Cross-Linking Agent | Dry weight ratios | Overall Concentration |
|---|---|---|---|---|---|
| E | Laing National T100D | Sto-Chem 2752 | B.C. 6 | 100<br>20<br>5 | 25% |
| F | Laing National A29 | Sto-Chem 2752 | B.C. 6 | 100<br>28<br>7 | 38% |
| G | Glucose | Sto-Chem 2752 | B.C. 6 | 25<br>60<br>15 | 60% |

The compositions were prepared by the method of Example 1.

The rubber is that described in Example 1 B.C. 6 is a substantially unmodified dimethylol urea sold by British Industrial Plastics Limited.

Example 4

The following compositions including a proteinaceous adhesive were found to give a water proof bond.

| Composition | Adhesive | Rubber Latex | Cross-Linking Agent | Dry weight ratios | Overall Concentration |
|---|---|---|---|---|---|
| H | Casein | Sto-Chem 2752 | Ammonium Zincate | 70<br>30<br>5 | 20% |
| J | Technical Gelatin | Sto-Chem 2752 | Ammonium Zincate | 80<br>20<br>5 | 15% |
| K | Bone Glue | Sto-Chem 2752 | Ammonium Zincate | 60<br>40<br>5 | 15% |
| L | Hide Glue | Sto-Chem 2752 | Ammonium Zincate | 70<br>30<br>5 | 15% |

Each of the above compositions was prepared by forming an aqueous solution of the protein, rendering the solution alkaline with ammonia (pH >9.5) and subsequently adding the latex and ammonium zincate.

In view of the many changes and modifications that may be made without departing from the principles underlying the invention, reference should be made to the appended claims for an understanding of the scope of the protection afforded the invention.

Having thus described my invention what I claim and desire to protect by Letters Patent is:

1. In a method comprising the steps of providing at least first and second sheets of fibrous material, which fibrous material comprises cellulose fibers, coating at least part of a surface of at least the first sheet with a composition comprising
    (A) an adhesive substance, selected from the group consisting of
        (a) water-soluble carbohydrate paper adhesives, and
        (b) water-soluble proteinaceous paper adhesives, and applying a surface of the second sheet to the coated surface of the first sheet so as to bond the two sheets together,
the improvement comprising adding to the adhesive, before coating the surface of the first sheet,
    (B) a latex dispersion, compatible with the adhesive, of a rubbery copolymer of (I) butadiene, (II) styrene, and (III) itaconic acid, and
    (C) a cross-linking agent operative to chemically link the adhesive to the copolymer under the conditions of bonding, selected from the group consisting of
        (c) a water-soluble A-stage urea-formaldehyde condensate,
        (d) a water-soluble A-stage melamine-formaldehyde condensate, and
        (e) a water-soluble complex salt of a di- or trivalent metal,
the said fibrous material being paper impregnated with aluminum triformate.

2. A laminate comprising at least first and second sheets of cellulosic fibrous material, the first sheet being bonded to the second sheet by an adhesive composition comprising:
    (A) an adhesive substance selected from the group consisting of
        (a) water-soluble carbohydrate paper adhesives, and
        (b) water-soluble proteinaceous paper adhesives;
    (B) a latex dispersion, compatible with the adhesive, of a rubbery copolymer of (I) butadiene, (II) styrene, and (III) itaconic acid; and
    (C) a cross-linking agent operative to chemically link the adhesive to the copolymer, selected from the group consisting of
        (c) a water-soluble A-stage urea-formaldehyde condensate,
        (d) a water-soluble A-stage melamine-formaldehyde condensate, and
        (e) a water-soluble complex salt of a di- or trivalent metal,
the said cross-linking agent (C) being chemically bound to the adhesive substance (A) and the copolymer of the latex (B), the said fibrous material being paper impregnated with aluminum triformate.

3. A method as in claim 1 wherein (A) is starch.

4. A method as in claim 1 wherein (A) is dextrin.

5. A method as in claim 3 wherein said starch comprises ungelatinized starch suspended in an alkaline aqueous solution of gelatinized starch.

6. A method as in claim 1 wherein (C) is a water-soluble A-stage urea-formaldehyde condensate.

7. A method as in claim 6, wherein said condensate is dimethylol urea.

8. A method as in claim 1 wherein (A) is casein.

9. A method as in claim 1 wherein (C) is ammonium zincate.

10. A method as in claim 1, wherein the first sheet is corrugated, the composition being coated onto the ridges of the corrugations.

11. A method as in claim 1, wherein (A) is starch and (C) is a water-soluble A-stage urea-formaldehyde condensate.

12. A method as in claim 1, wherein (A) is casein, and (C) is ammonium zincate.

13. A laminate as in claim 2, wherein the first sheet is corrugated, the first sheet being bonded to the second sheet along the ridges of the corrugations.

14. A laminate as in claim 2, wherein (A) is starch and (C) is a water-soluble A-stage urea-formaldehyde condensate.

15. A laminate as in claim 2, wherein (A) is casein and (C) is ammonium zincate.

References Cited

UNITED STATES PATENTS

| | | | |
|---|---|---|---|
| 2,212,557 | 8/1940 | Bauer | 156—336 |
| 2,302,309 | 11/1942 | Glarum et al. | 260—9 |
| 2,489,170 | 11/1949 | Wooster et al. | 161—210 |
| 2,702,284 | 2/1955 | Brock | 260—29.6 |
| 2,782,178 | 2/1957 | Duffee. | |
| 2,791,600 | 5/1957 | Schwaegerle | 260—29.6 |
| 2,827,441 | 3/1958 | Romatowski | 156—331 |
| 2,861,968 | 11/1958 | Wolf et al. | 260—29.6 |
| 2,862,896 | 12/1958 | Dede et al. | 156—328 |
| 2,868,741 | 1/1959 | Chambers et al. | 260—8 |
| 2,871,213 | 1/1959 | Graulich et al. | |
| 2,881,143 | 4/1959 | Wilson | 260—8 |
| 2,886,541 | 5/1959 | Langlois et al. | 156—328 |
| 2,890,148 | 6/1959 | Dede | 260—6 |
| 2,901,453 | 8/1959 | Jordan | 260—29.6 |
| 2,904,526 | 9/1959 | Uelzmann | 260—29.6 |
| 2,930,728 | 3/1960 | Navikas | 156—328 |
| 2,935,484 | 5/1960 | Arnold et al. | 156—328 |
| 3,004,855 | 10/1961 | Smith et al. | 156—328 |
| 3,166,523 | 1/1965 | Weinheimer | 156—6 |

EARL M. BERGERT, *Primary Examiner.*

W. E. HOAG, *Assistant Examiner.*